(No Model.)

P. McMENAMIN.
VEHICLE HUB.

No. 421,051.  Patented Feb. 11, 1890.

Attest.
Victor J. Evans.
A. L. Evans

Inventor.
Peter McMenamin
By J. F. Beale, Atty.

UNITED STATES PATENT OFFICE.

PETER McMENAMIN, OF JERSEY CITY, NEW JERSEY.

VEHICLE-HUB.

SPECIFICATION forming part of Letters Patent No. 421,051, dated February 11, 1890.

Application filed December 11, 1889. Serial No. 333,323. (No model.)

*To all whom it may concern:*

Be it known that I, PETER MCMENAMIN, a citizen of the United States, residing at Jersey City, in the county of Hudson and State of New Jersey, have invented certain new and useful Improvements in Hubs and Axles; and I do hereby declare the following to be a full, clear, and exact description of the invention, such as will enable others skilled in the art to which it appertains to make and use the same.

My invention relates to improvements in the construction of hubs and axle-bearings of wheels; and, besides its other advantages, it is chiefly my object to reduce the friction-surface at bearing-points of hub and axle; also, to reduce the lateral play of the hub, upon the axle, while the play at the tire-line may be normal; also, to provide shorter axles and axle-arms for a given width of vehicle-body; also, to avoid the lateral projections of hub beyond the body of the wheel upon either side; also, to produce a stronger, steadier, and smoother running bearing for hub and axle, the parts of which are readily accessible for repair or oiling without removing the wheel from the axle.

My invention consists in providing a square-shouldered axle with a fixed circular plate, said axle having a short axle arm or spindle of equal diameter at all points.

My invention further consists of a hub having a bearing for said axle-arm and held in position by a circular plate screwed to the end of the axle-arm. The hub proper consists of a journal or bearing for the axle-arm having affixed thereto two circular plates with dished or recessed faces, and between which are secured at suitable distances short T-shaped pieces to form sockets for the spokes.

My invention further consists in providing said hub with suitable dust-guards, means for oiling the hub and axle, and other novel features, as hereinafter more fully shown and described.

Figure 1:
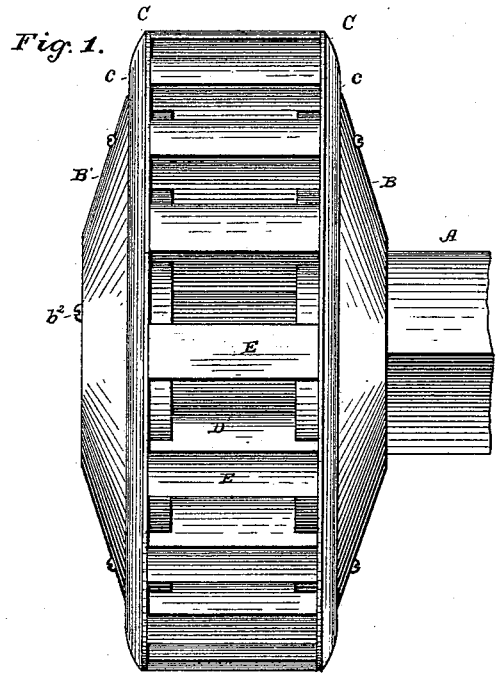
Figure 2:
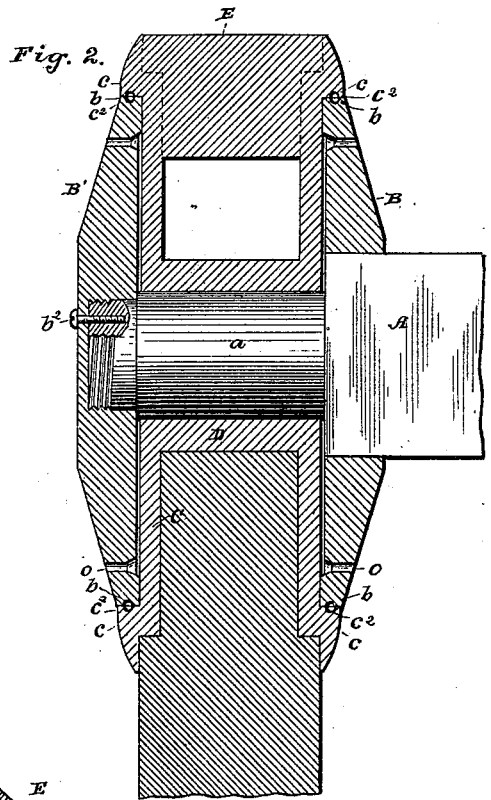
Figure 3:
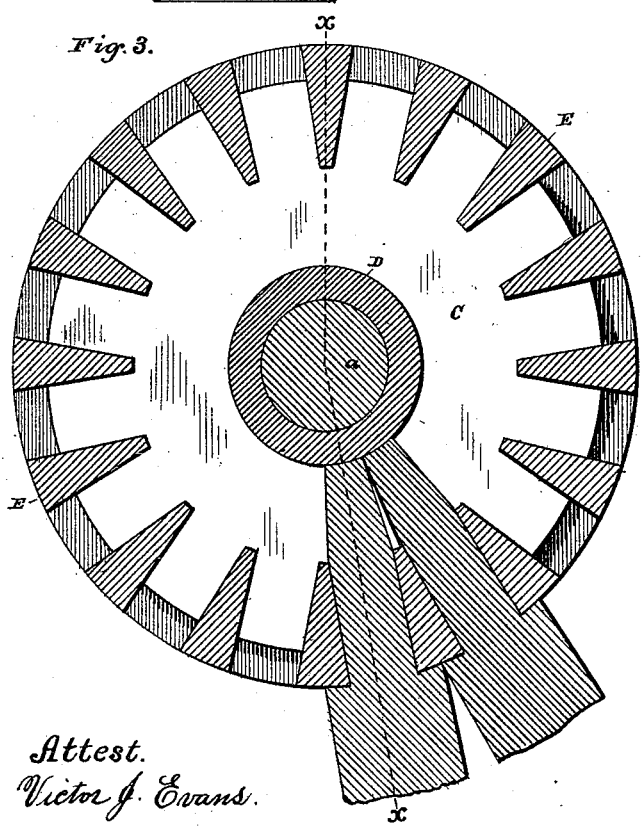
Figure 4:
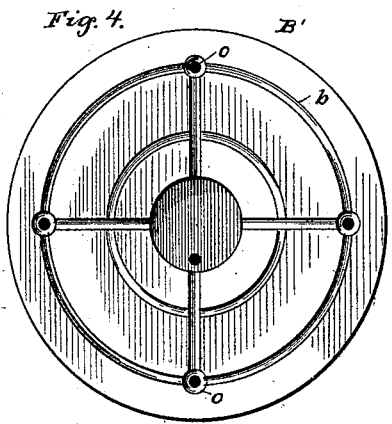

In the accompanying drawings, forming part of this specification, Figure 1 is a side elevation. Fig. 2 is a cross-section on line $x$ $x$ of Fig. 3. Fig. 3 is a longitudinal section, showing two spokes in position. Fig. 4 is a reduced plan view of inner face of cap-plate.

A denotes a square-shouldered axle having an axle-arm $a$ and a circular plate or disk B rigidly secured thereto. Said disk has a groove $b$ running around its periphery, and is provided with four oil-wells $o$, having open channels connecting with each other and leading to the axle, as shown in Fig. 4. Said wells are closed by suitable screw-taps.

The hub is composed of a journal D and two plates C C, rigidly secured to said journal. Said plates have flanges $c$ upon their faces, provided with grooves $c^2$. Said flanges form with the peripheries of said plates, as shown in Fig. 2, a right-angled socket or bearing for the T-shaped partition or socket pieces E.

B' is a disk or plate which serves to fasten the hub in position. It is provided with a screw-threaded opening to fit the end of the axle. Said disk has oil-wells and channels similar to disk B, and a plan of both is seen in Fig. 4.

$b^2$ is a screw to lock the plate B to the axle and prevent it from turning.

The oil-wells and connecting-channels serve to distribute the oil over the surface of the plates and to the axle-arm. Grooves $b$ serve as dust-guards to prevent the dust working into the hub and axle.

As shown in Fig. 3, the inner ends of the spokes bear against the journal of the hub, and in Fig. 2 the shape of the socket to hold the spoke is shown. It will be seen that by this form of socket the spoke is held and braced at every point and the weight is thrown on the periphery of the plates C C perpendicular to the axle.

It is evident that my hub and axle-bearing are adapted to a variety of wheels.

The hub proper, consisting of the two pieces C C, the T-shaped pieces E, and journal D, may all be cast in one piece, as shown in Fig. 2, and the disk B B' cast in separate pieces, or the disk B could be cast integral with the axle head and arm.

My invention is valuable as applied to that class of car-wheels made to turn independent of the axle. It is also valuable as applied to the wheels of trucks, as the load-line of the body of the truck can be brought nearer to the axle-arm.

My invention is also valuable as applied to vehicle-hubs generally.

I claim—

1. A hub and axle consisting of a square-shouldered axle with a fixed circular plate fitting into said shoulder, an axle having a short axle-arm of equal diameter at all points, a hub consisting of a journal for the axle-arm, having affixed thereto two circular plates with outwardly-projecting flanges, between which are held T-shaped socket-pieces, said hub being held in position by a cap-plate secured to and inclosing the end of the axle-arm.

2. The combination, with a hub having recessed outer faces and a groove formed in the flanges surrounding said recesses, of the disks rigidly secured to the axle and having grooves formed on their peripheries to correspond with said flange-grooves, substantially as described.

3. The combination, with a hub having recessed outer faces and a groove formed in the flanges surrounding said recesses, of the disks rigidly secured to the axle and having grooves formed on their peripheries to correspond with said flange-grooves, and channels formed on the inner faces of said disks and perforations formed at one end of said channels, substantially as described.

4. In a vehicle-hub, the combination of the plates C C, having flanges c, the separate T-shaped socket-pieces, and the spokes, substantially as described.

5. In a wheel or hub, the combination of the axle A, axle-arm a, the disk B, rigidly affixed to said axle, the hub consisting of plates C C, journal D, the separate T-shaped pieces E, and the disk or cap-plate B', inclosing the end of the axle-arm, substantially as shown and described.

In testimony whereof I affixed my signature in presence of two witnesses.

PETER McMENAMIN.

Witnesses:
 JAMES ADAMS,
 F. G. KITTREGE.